United States Patent [19]

Bowles et al.

[11] Patent Number: 4,966,537
[45] Date of Patent: Oct. 30, 1990

[54] HAND-OPERATED DISPENSERS OF SEMI-SOLID MATERIALS SUCH AS ICING FOR CAKES

[75] Inventors: William B. Bowles; Margaret A. Bowles, both of Aldershot, United Kingdom

[73] Assignee: John W. Dixon, United Kingdom

[21] Appl. No.: 303,726

[22] PCT Filed: May 18, 1988

[86] PCT No.: PCT/GB88/00392
    § 371 Date: Jan. 19, 1989
    § 102(e) Date: Jan. 19, 1989

[87] PCT Pub. No.: WO88/09128
    PCT Pub. Date: Dec. 1, 1988

[30] Foreign Application Priority Data

May 19, 1987 [GB] United Kingdom ............... 8711835

[51] Int. Cl.⁵ .................. B05C 17/00; A23G 3/28
[52] U.S. Cl. ........................ 425/87; 222/323; 222/327; 222/391; 425/458
[58] Field of Search ............ 425/458, 87; 222/323, 222/324, 325, 391, 327

[56] References Cited

U.S. PATENT DOCUMENTS

| | | | |
|---|---|---|---|
| 634,786 | 10/1889 | Willower | 425/376.1 |
| 977,282 | 11/1910 | Vilbiss | 425/458 |
| 1,435,908 | 11/1922 | Muehl | 425/87 |
| 1,621,172 | 3/1927 | McKenzie | 222/324 |
| 2,205,604 | 6/1940 | Sherbondy | 222/391 |
| 2,634,692 | 4/1949 | Sherbondy | 425/87 |
| 3,953,006 | 4/1976 | Patarcity et al. | 259/91 |
| 4,033,487 | 7/1977 | Micalleff | 222/324 |
| 4,645,487 | 2/1987 | Shislov et al. | 222/325 |
| 4,681,524 | 7/1987 | Ikeda et al. | 222/591 |

FOREIGN PATENT DOCUMENTS

| | | | |
|---|---|---|---|
| 3109333 | 9/1982 | Fed. Rep. of Germany | 425/87 |
| 2535206 | 5/1984 | France | 425/87 |
| 56591 | 7/1911 | Switzerland | 425/87 |
| 930616 | 7/1963 | United Kingdom | 425/87 |

Primary Examiner—James C. Housel
Assistant Examiner—K. P. Nguyen

[57] ABSTRACT

A hand-held dispenser for icing cakes, consisting of a cylindrical body to contain cake icing, possibly in a liner, a piston on a piston rod to eject a stream of icing from the cylinder and through a nozzle; and a pivotal lever arranged to drive the piston into the cylinder. The piston is located alongside the cylinder so that the dispenser can be held and operated by the same hand. The piston is driven incrementally by means of a plate which is tilted to grip and drive the piston rod, and spring-loaded outwardly to free the rod whenever the lever is released.

8 Claims, 3 Drawing Sheets

1

HAND-OPERATED DISPENSERS OF SEMI-SOLID MATERIALS SUCH AS ICING FOR CAKES

BACKGROUND OF THE INVENTION

1. Field of the Invention

This invention relates to hand-operated dispensers of semi-solid or viscous materials, and is particularly intended for use in the decorative icing of cakes.

2. Description of Related Art

Dispensers for cake icing are well-known, and usually comprise either a muslin bag having a base opening, or a syringe-type mechanical device. Muslin bag dispensers are relatively difficult to use, and are only practical for relatively large and skilled operations such as occur in bakeries and restaurants. Syringe-type dispensers are simple, but often fail to produce satisfactory results as the device tends to be unsteady in the user's hand, and it is also difficult to produce a steady flow of icing.

Dispensing guns for mastics and sealants are also wellknown, and these usually comprise a frame having a handle and a trigger which press together to operate a piston which extrudes the material from the nozzle of a cartridge, the piston being advanced in steps by a one-way drive which includes a releasable blocking plate. This arrangement has not proved suitable for 'artistic' operations such as cake icing, as the remote nozzle tends to wander and the flow of material is not only difficult to control but also tends to be non-uniform and to continue at least briefly after release of the trigger.

It is an object of the present invention to provide an improved but relatively simple dispenser for use primarily in the decorative icing of cakes, which is easy to operate while producing very satisfactory results.

SUMMARY OF THE INVENTION

According to the present invention there is provided a hand-held dispenser comprising: a cylindrical body to contain semi-solid material such as cake icing; a piston on a piston rod, to be driven into one end of the cylinder of the body to eject a stream of material from a nozzle-opening at the other end of the cylinder; and, a lever pivotally mounted adjacent said one end of the cylindrical body and arranged to drive the piston rod with its piston incrementally inwardly as the lever is pressed towards the cylinder, the lever being located generally alongside the cylinder so that the dispenser can be held and the lever pressed by one hand.

The cylinder may be adapted to receive material such as cake icing directly, or may be provided with a reusable or disposable liner or a cartridge-like container of the material.

BRIEF DESCRIPTION OF THE DRAWINGS

An embodiment of the invention will now be described, by way of example, with reference to the accompanying drawings in which.

DESCRIPTION OF THE PREFERRED EMBODIMENT

Figure 1:
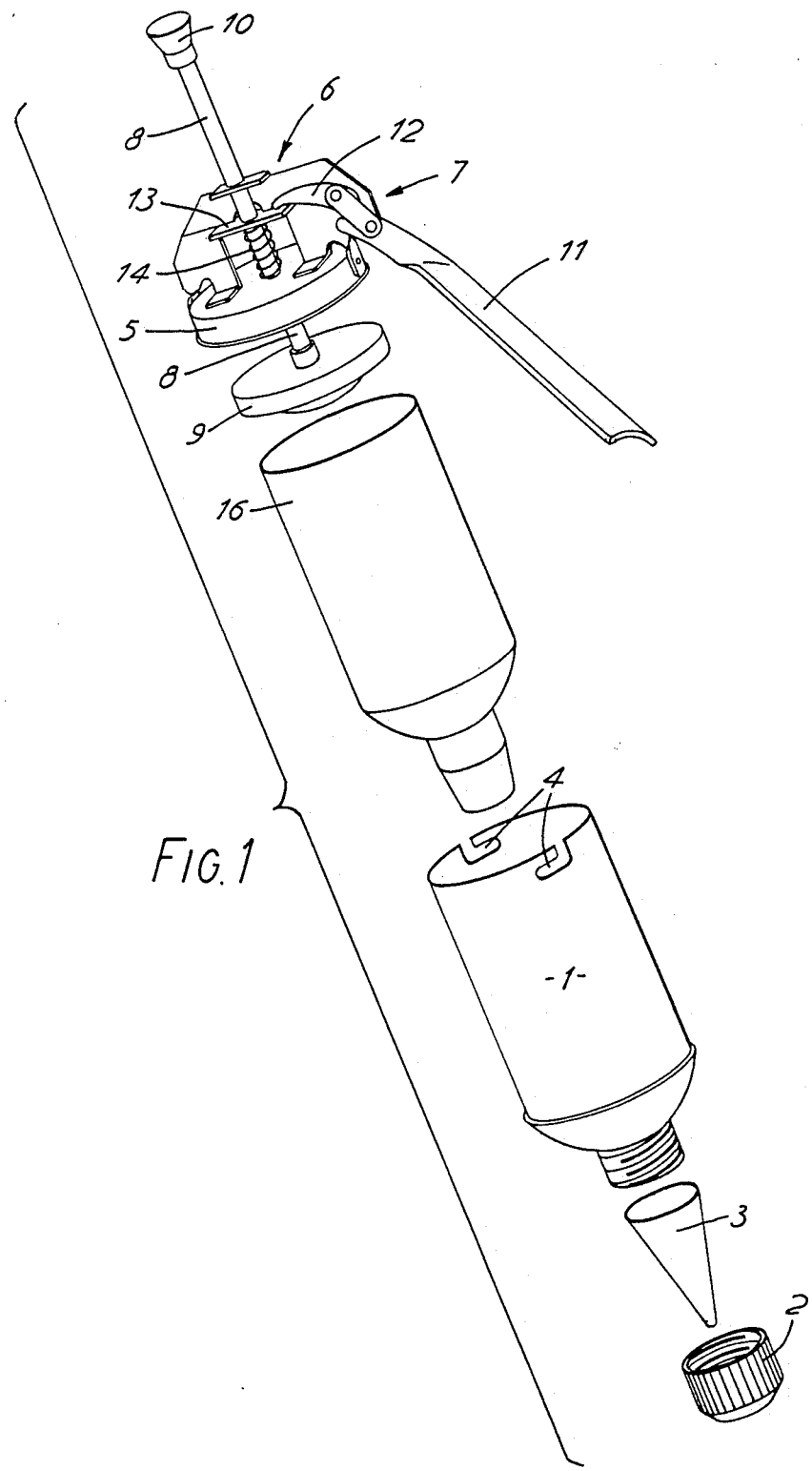
FIG. 1 is an exploded view showing a dispenser for cake icing.

Referring to the drawings, the dispenser comprises a cylindrical, stainless-steel body 1 having at one end a tapped ferrule 2 of plastics material which clamps a nozzle 3 in position on the body.

At its other end, the body 1 has bayonet slots 4 to receive a stainless-steel end cap 5 which carries a shaped mounting 6, and an operating mechanism 7 for a piston rod 8. A piston 9 is mounted at one end of the rod 8, and a knob 10 is secured at the other end of the rod which passes freely through the mounting 6 and the cap 5.

The operating mechanism comprises a pivotally-mounted lever or trigger 11, and a pivotal link 12 positioned to engage and drive plate 13 which is urged outwardly by a compression spring 14 around the rod 8 to abut against the mounting 6. A metal tie 15 interconnects the pivots of the lever and the link.

Preferably, a cylindrical liner 16 formed of thin plastics material is provided to nest inside the cylindrical body to carry a supply of cake icing, and the dispenser device may be provided with a number of translucent liners to receive different colours of icing, or the liners may be supplied filled with icing. A range of nozzles 3 may also be provided.

In use, with the components fitted together and with the filled liner 16 inside the cylindrical body, the piston 9 is pushed inwardly, by means of the knob 10, to engage the end surface of the icing. Pressure on the knob is continued until icing appears at the end of the nozzle 3.

Figure 2:
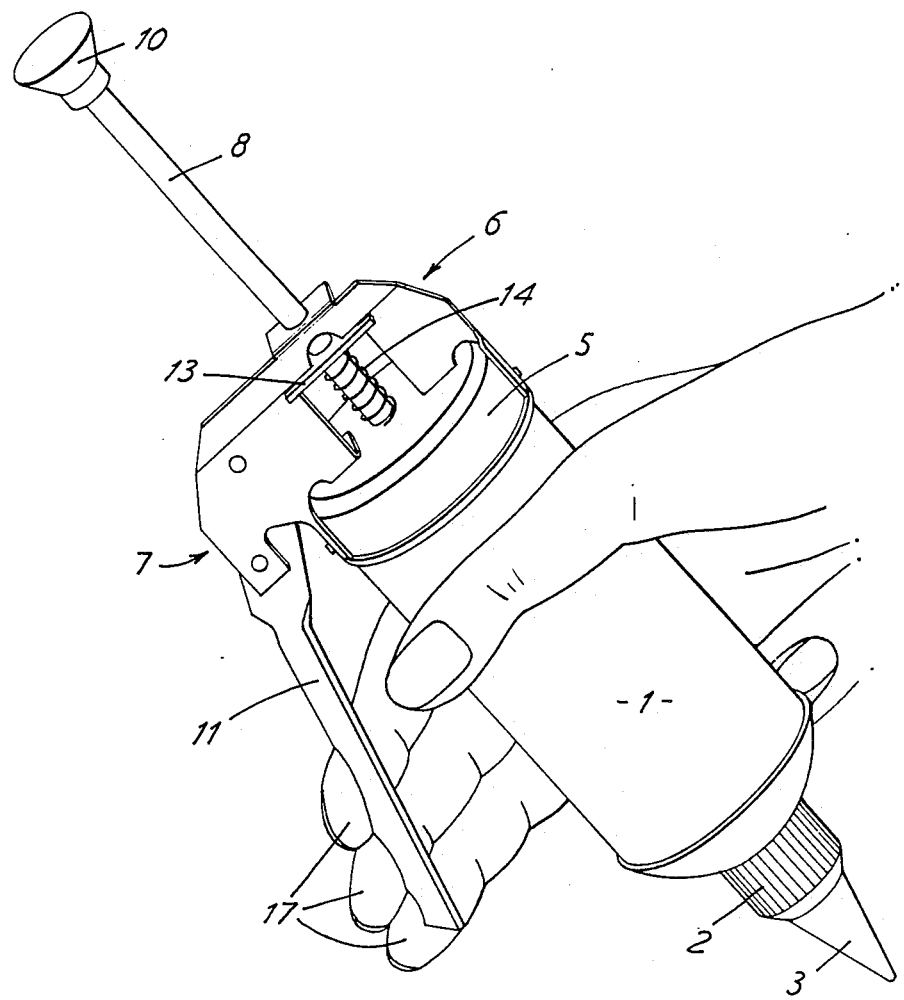
FIG. 2 is a perspective view showing the dispenser as held by the user.
Figure 3:
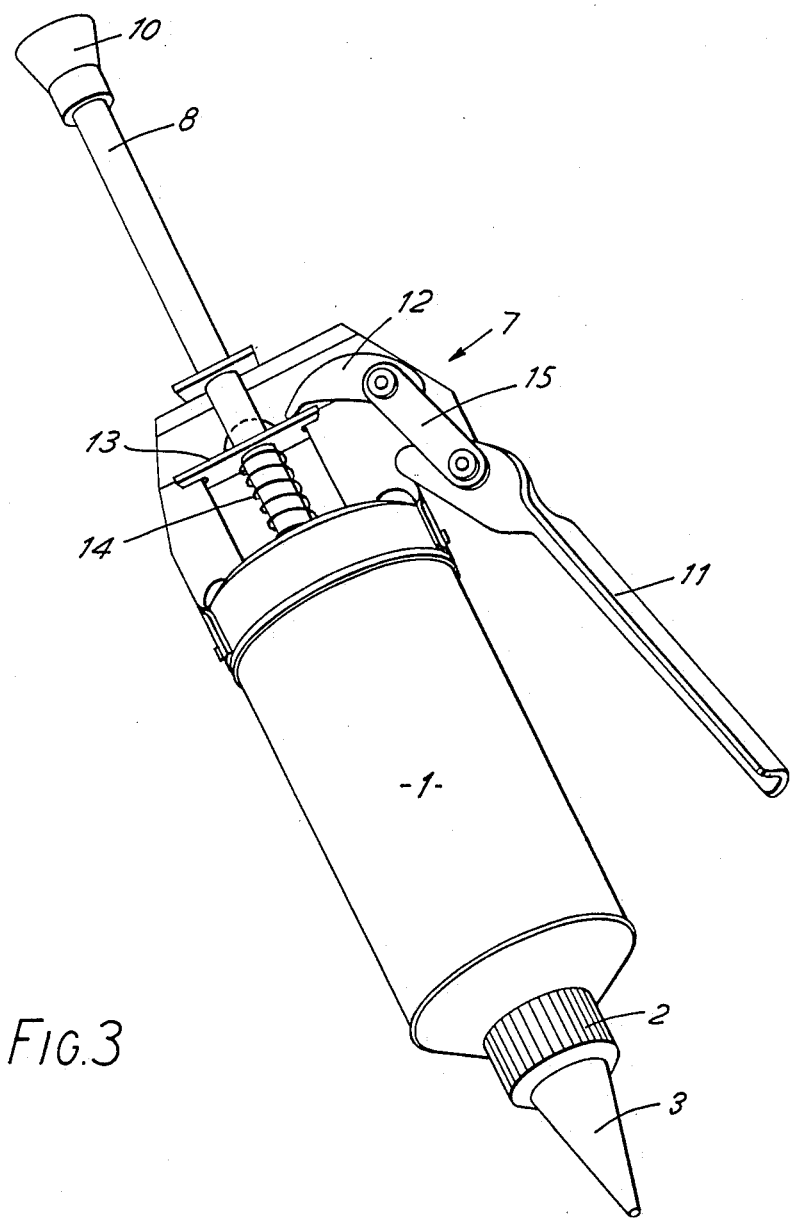
FIG. 3 is a perspective view showing the other side of the dispenser.

The dispenser can then be held in one hand, as shown in FIG. 2, and the trigger 11 pressed by the fingers 17 of the same hand, towards the cylindrical body 1. This action pivots the link 12 to tilt the plate 13 which grips and drives the piston rod inwardly. Release of finger-pressure on the trigger will allow the plate to tilt back under the action of the spring 14, release its grip on the rod 8, and so terminate the flow of icing from the nozzle 3 virtually immediately. The flow may be re-started virtually instantly by re-applying pressure to the trigger.

It has been found that as the dispenser can be held steadily and operated by a trigger movement which is sensitive and does not tend to cause undue wavering of the nozzle, very accurate positioning of the desired amount of icing can be achieved. Furthermore, it has been found that the immediacy of the stoppage of flow of icing, by release of pressure on the trigger, avoids any overflow of icing and further promotes neat and attractive results in decorating cakes.

The dispenser has been developed for the purpose of cake icing, but can obviously be used or adapted for use with alternative materials.

We claim:

1. A hand-held dispenser of semi-solid material comprising: a cylindrical body adapted to contain semisolid material; a piston on a piston rod having an uninterrupted surface and adapted to be driven into one end of the cylinder of the body to eject a stream of material from a nozzle-opening at an outer end of the cylinder; a lever pivotally mounted adjacent said one end of the cylindrical body and adapted to drive the piston rod with its piston incrementally inwardly as the lever is pressed towards the cylinder, the lever having a pivot point and being located generally alongside the cylinder so that the cylinder can be held and the lever pressed by one hand; a plate penetrated by said piston rod and adapted to be tilted by said lever to grip said uninterrupted surface of the piston rod and to drive the piston rod through infinitely variable distances, the plate being spring-loaded with a compression spring to free the piston rod on release of pressure on the lever and so release completely the pressure on any semi-solid material contained in the cylindrical body; and an operating mechanism between said lever and said plate comprising a pivotal link which has a pivot point spaced from the lever's pivot point, which engages said plate and which is arranged to be pivoted by said lever to drive said plate against the action of the compression spring.

2. A dispenser as claimed in claim 1, wherein said cylindrical body comprises a body part and a removable cap at said one end, and a mounting on the cap which is adapted to support said lever and to provide a guide for said piston rod.

3. A dispenser as claimed in claim 2, wherein said plate is also carried by said mounting, and the compression spring encircles said rod and extends between said cap and the plate.

4. A dispenser as claimed in claim 1, wherein said piston rod extends beyond said one end of the cylindrical body and is provided with a finger-engagable actuator to facilitate operation of the piston rod when free.

5. A dispenser as claimed in claim 1, adapted for use in icing cakes, and further comprising at least one liner adapted to contain icing and to nest within said cylindrical body.

6. A dispenser as claimed in claim 1, wherein said piston rod is of circular section.

7. A dispenser as claimed in claim 4, wherein said actuator comprises a knob.

8. A dispenser as claimed in claim 5, wherein the liner has an open end through which the piston is adapted to enter.

* * * * *